Oct. 11, 1927.

T. F. LILLY 1,645,246

HYDRAULIC POWER TRANSMISSION MECHANISM

Filed March 7, 1925

Inventor
Thomas F. Lilly,
By John W. Farley
Atty.

Patented Oct. 11, 1927.

1,645,246

UNITED STATES PATENT OFFICE.

THOMAS F. LILLY, OF MEMPHIS, TENNESSEE.

HYDRAULIC POWER-TRANSMISSION MECHANISM.

Application filed March 7, 1925. Serial No. 13,690.

My invention relates to hydraulic power transmission mechanisms and its object is to provide a device capable of use in connection with automobiles to transmit power of varying ratio from the engine to the driving means, for use as a clutch and change speed device, as a differential mechanism or for similar purposes, in which the fluid pressure shall be so applied to the driving and driven parts as to effectively close the passages between the moving parts and thus prevent the escape of the fluid and loss of effective pressure.

With this object and others in view, my invention is embodied in preferable form in the mechanism hereinafter described and illustrated in the accompanying drawings, in which drawings—

Figure 1:
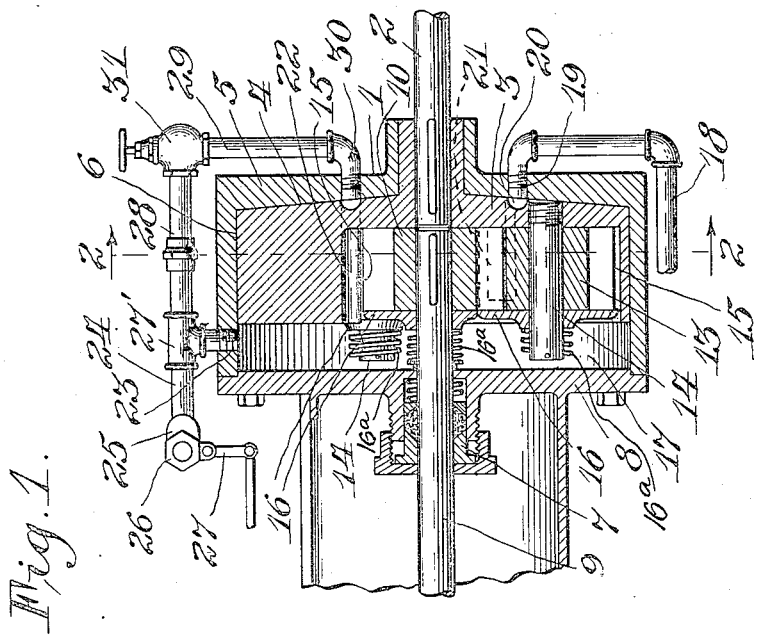
Figure 2:
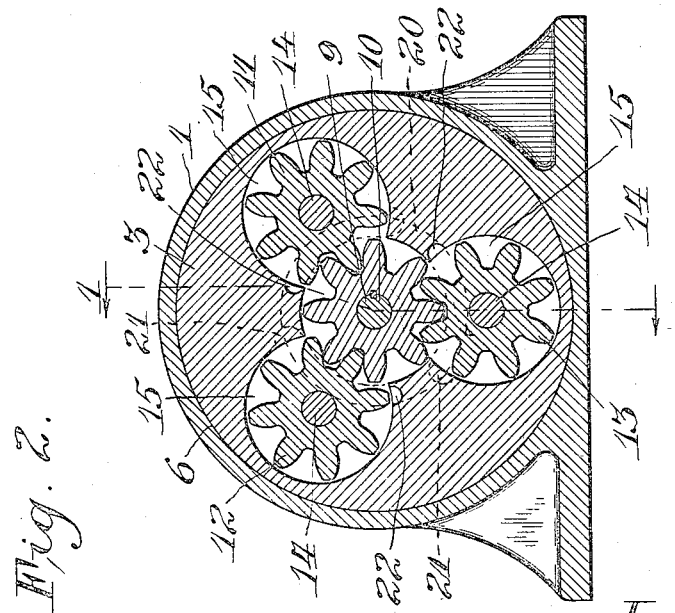

Fig. 1 is a vertical longitudinal section on line 1—1 of Fig. 2 through the mechanism; and Fig. 2, a vertical cross section on line 2—2 of Fig. 1.

Referring to the drawings, 1 is a fixed casing in which the mechanism is mounted. A driving shaft 2, which may be the drive shaft of an internal combustion engine of an automobile, projects into the casing and is splined to the driving element 3 of the transmission mechanism. This driving element consists of a hollow disk-like or cylindrical member having a tapered self-seating rear wall 4, providing a close and fluid excluding fit against the inner face of the end wall 5 of the casing. The peripheral face 6 of the member also has a close bearing fit against the inner face of the side wall of the casing.

Extending into the casing through a fluid tight stuffing-box 7 mounted in the removable end wall 8 of the casing, is a driven shaft 9 to which is splined a driven gear member 10, adapted to receive power from intermediate gear members carried by the driving element 3, and in proportion to fluid pressure imposed upon the driving and intermediate gears.

These intermediate transmission toothed elements correspond in effect to the members of a gear pump, and comprise gears, 11, 12 and 13, disposed in planetary arrangement with respect to the driven gear 10 and adapted to mesh therewith. Each intermediate gear is rotatably mounted upon a stub shaft 14 fixed within a cylindrical chamber 15 formed in the driving element and carrier 3, the peripheries of the gear teeth closely fitting the surfaces of the respective chambers.

Bearing against each outer face of the gears 11, 12 and 13 and also against the gear 10 is a spring-pressed washer, each designated by 16. Between the outer faces of these washers and the outer wall of the driving element 3 on one side and the inner face of the end wall 8 of the casing, is provided a fluid pressure chamber 17, in which the pressure of the fluid, acting to lock the gears, is also directed only against one face of the closely fitting driving element 3 and against the washers for the intermediate gears with the object and with the result of pressing the driving member and the gears closely to their seats, so as to seal the pressure chamber against the escape of the fluid and prevent the loss of pressure. This arrangement constitutes the main distinctive feature of my invention.

The pressure fluid, preferably oil, is conducted by a pipe 18 from a receptacle, not shown, to a port 19 in the end wall of the casing 1, which communicates with a circular channel or groove 20, formed in the inner face of the drive member 3, which in turn communicates with the suction ports 21, opening into the chambers in which the gears 11, 12 and 13 are mounted. Discharge ports 22 lead from these gear chambers to the pressure chamber 17. The pressure chamber communicates, by an opening 23 with a pipe 24. In this pipe is a head 25 in which is mounted a controlling valve 26, having connected thereto an operating lever 27, which may be connected to means operated by hand or automatically as desired. A T-head 27' is formed in the pipe 24 and receives the end of a branch 28, leading to a by-pass pipe 29, leading back to a port 30 in registry with channel 20. A relief valve 31 is mounted at the junction of branch 28 and by-pass 29, and serves the function of relieving the pressure should it be excessive, by permitting the by-passing of the fluid back to the chamber.

The operation of the mechanism is as follows:—

The driving shaft 2 being rotatably driven, will turn the driving element and gear carrier 3, and oil will be sucked through the pipe 18 and into the chambers surrounding the gears 11, 12 and 13 and thence into the chamber 17. If the controlling valve 26, be open, the fluid will pass freely around the gears and out into the pipe 24 and thence back to the oil receptacle. In this condition, the gears 11, 12 and 13 will turn freely upon their shafts and revolve around gear 10 and no turning movement will be imparted to the driven shaft 9. If the valve 26 be closed however, a pressure will be established in the chamber 17 and the gear chambers, which will lock the gears 11, 12 and 13 against the driven gear 10, and rotate the latter and thereby transmit power to the driven shaft 9. To decrease the ratio of power transmitted, the valve 26 is opened proportionally, whereupon the pressure in the chamber 17 and on the gears will be decreased and less power transmitted.

It will be seen that the pressure in the chamber 17 is exerted against one lateral face only of the driving element 3 and against the washers 16 which are spring pressed against the gears by means of springs 16ª. The result is that both the member 3 and the gears are pressed tightly to their seats, preventing the escape of oil, and effectually taking up wear, which result is further insured by the tapered rear wall of the member 3 which permits a wearing down of the wall to a true seat. The springs 16ª bearing against the washers hold the latter against the gears when the pressure is relieved.

Many applications to power transmitting purposes of the mechanism above described, may be obtained, within the scope of invention defined in the appended claims.

What I claim is:

1. A fluid power transmission device having a fixed casing, a rotatable driving element seated in one end therein, a rotatable driven element therein, intermediate elements operable under fluid pressure to operatively connect said driving and driven elements, and means to admit fluid pressure to said elements and fixed casing and against one face of said driving element, whereby the latter is forced to its seat by said pressure.

2. A fluid power transmission device having a fixed casing, a rotatable driving element freely seated therein, a driven element, intermediate elements freely seated in one end in said driving element and operable under fluid pressure to operatively connect said driving and driven elements, and means to admit fluid pressure to said elements and fixed casing and against one face of the driving element and against one face of each of the intermediate elements, whereby said elements are operatively engaged and are forced to their seats.

3. A fluid power transmission device having a fixed casing, a rotatable driving element mounted in said casing and having its periphery and one face thereof bearing against said casing, a driven element, intermediate connecting elements, means to admit fluid pressure to said casing, and means to direct said pressure against a fixed wall of the casing and the other face of said driving element.

4. A fluid power transmission device having a fixed casing, a rotatable driving element and a driven element therein, intermediate elements operable under fluid pressure to operatively connect said driving and driven elements, said driving element having a close bearing fit at its periphery and on one face thereof against walls of the casing and being free to move relatively to said walls, said casing having a fluid pressure chamber formed by and between a fixed wall of the casing and a face of said driving element, whereby upon the establishment of pressure in the chamber to interengage said elements the driving element will be forced closely to its bearing seat in the casing.

5. A fluid power transmission device having a fixed casing, a rotatable driving element and a driven element therein, intermediate connecting elements operable to drivably engage the driving with the driven elements upon the establishment of fluid pressure in the casing, all of said elements having a sliding fit in their supports, said casing having a chamber receiving the pressure fluid and formed between a wall of said casing and said elements, and means to direct the pressure of said fluid only against one face of each of said elements in operatively engaging the same to thereby force them to their seats.

6. A fluid power transmission device comprising a fixed casing, a rotatable driving element mounted within said casing and having one lateral face and its periphery fitting against the walls of the casing and movable with respect thereto, a toothed driven member in said casing and substantially embraced within the periphery of said driving element, and having an axially slidable mounting, toothed connecting and transmitting elements carried by and revoluble with said rotatable driving element and each rotatable with respect to said driving and carrying element, said connecting elements being substantially embraced within the peripheral surface of the driving and carrying element, and said casing having a chamber formed by and between the outer faces of said elements and a fixed wall of said casing in which chamber alone the effective pressure of the fluid is established.

7. A fluid power transmission device having a casing, a rotatable driving and gear carrying element in said casing, and planetary connecting and driven gearing, a fluid pressure chamber outside of one axial end of said element and gearing, and means to admit pressure fluid through the gear carrying element to said chamber substantially parallel to the axis thereof.

8. A fluid power transmission device having a fixed casing, planetary gearing within said casing, said gearing being free to move axially, the carrier element of said gearing having a closing and bearing fit against a wall and the inner circumferential surface of the casing, an opposing fixed wall of said casing and the adjacent face of said gearing forming between them a fluid pressure chamber, means to admit fluid to said chamber through said carrier substantially parallel to the axis thereof, means to discharge said fluid radially from said chamber, and pressure controlling means.

9. A fluid power transmission device having a fixed casing, a rotatable driving member therein capable of axial movement and having a close peripheral bearing fit against said casing and having a tapered rear face bearing against a wall of the casing, a driven element and connecting elements, and means causing fluid pressure in said casing at the axial end of the driving element opposite to the end in contact with said casing wall.

10. A fluid transmission device having a fixed casing, walls carried by said casing, axially movable planetary gearing within one side of the casing, and spaced from one of the walls thereby providing a fluid pressure chamber, washers carried at the axial ends of the gears of said gearing and receiving the pressure of said fluid.

11. A fluid power transmission device having a fixed casing, a driving shaft, a rotatable driving and gear carrying member splined on said shaft and having a close bearing fit at its periphery and one face against walls of said casing, gears carried by said member, an inner driven gear, said casing having a lateral fluid pressure chamber between said member and gears and a wall of the casing, a fluid admitting conduit leading through the casing to said chamber substantially parallel to the axis of the casing, exit means leading from the chamber, controlling means for the fluid pressure, and pressure receiving washers at the ends of said member and gears, to receive the pressure.

In testimony whereof I affix my signature.

THOMAS F. LILLY.